(12) United States Patent
Garcia et al.

(10) Patent No.: US 10,594,388 B2
(45) Date of Patent: Mar. 17, 2020

(54) SATELLITE TERMINAL SYSTEM WITH WIRELESS LINK

(71) Applicant: Blue Digs LLC, Wilmington, DE (US)

(72) Inventors: Reed Garcia, El Segundo, CA (US); Valerie Chang, Los Angeles, CA (US); James Gordon, Los Angeles, CA (US)

(*) Notice: Subject to any disclaimer, the term of this patent is extended or adjusted under 35 U.S.C. 154(b) by 0 days.

(21) Appl. No.: 16/363,915

(22) Filed: Mar. 25, 2019

(65) Prior Publication Data

US 2019/0222304 A1 Jul. 18, 2019

Related U.S. Application Data

(63) Continuation of application No. 15/672,180, filed on Aug. 8, 2017, now Pat. No. 10,270,523.

(60) Provisional application No. 62/523,017, filed on Jun. 21, 2017.

(51) Int. Cl.
*H04B 7/185* (2006.01)
*H04B 7/19* (2006.01)
*H02J 50/10* (2016.01)
*H02J 50/20* (2016.01)

(52) U.S. Cl.
CPC .......... *H04B 7/18584* (2013.01); *H02J 50/10* (2016.02); *H02J 50/20* (2016.02); *H04B 7/18517* (2013.01); *H04B 7/19* (2013.01)

(58) Field of Classification Search
None
See application file for complete search history.

(56) References Cited

U.S. PATENT DOCUMENTS

| | | | |
|---|---|---|---|
| 2009/0097481 A1* | 4/2009 | Diab | H04L 12/40136 370/389 |
| 2009/0243397 A1* | 10/2009 | Cook | H02J 5/005 307/104 |
| 2013/0210346 A1 | 8/2013 | Ling et al. | |
| 2015/0381293 A1* | 12/2015 | Hardy | H04B 17/318 455/67.7 |
| 2016/0301867 A1 | 10/2016 | Robinson et al. | |
| 2016/0308601 A1* | 10/2016 | Mochida | H01Q 1/1257 |
| 2017/0214456 A1* | 7/2017 | Ozaki | H01Q 3/18 |

* cited by examiner

*Primary Examiner* — Mohammed Rachedine

(57) ABSTRACT

A satellite system may have a constellation of communications satellites. Satellite terminal equipment may be used to communicate with the satellite constellation. The satellite terminal equipment may have indoor and outdoor equipment that can communicate wirelessly. Power may be conveyed wirelessly between the indoor equipment and the outdoor equipment. The indoor equipment may include communications circuitry for supporting communications with electronic devices. The outdoor equipment may include satellite communications circuitry. The satellite communications circuitry may include antennas, satellite transceiver circuitry, and modems. Wireless communications between the indoor and outdoor equipment may be supported using radio-frequency wireless communications circuits or optical communications circuits.

20 Claims, 5 Drawing Sheets

SATELLITE TERMINAL SYSTEM WITH WIRELESS LINK

This application is a continuation of U.S. patent application Ser. No. 15/672,180, filed Aug. 8, 2017, which claims the benefit of provisional patent application No. 62/523,017, filed on Jun. 21, 2017, each of which is hereby incorporated by reference herein in its entirety.

FIELD

This disclosure relates generally to satellite communications, including to terminals for use in satellite systems.

BACKGROUND

Communications systems often use satellites to convey data. Satellite-based systems allow information to be conveyed wirelessly over large distances, such as oceans and continents. For example, satellite-based systems can be used to convey media information to a large number of receivers over a large area, such as broadcast satellite networks. Further, satellite communications systems can be used to provide coverage where physical infrastructure has not been installed and/or to mobile devices that do not remain attached to an infrastructure resource. For example, satellite communications systems can provide communications capabilities to land-based devices such as handheld equipment and home or office equipment.

It can, however, be challenging to provide satellite access to large numbers of users. For example, the installation and maintenance of user terminal equipment can be overly complex and expensive, and/or can be unable to deliver desired levels of performance.

SUMMARY

A satellite system may have a constellation of communications satellites. Satellite terminal equipment may be used to communicate with the satellite constellation. The satellite terminal equipment may have indoor and outdoor equipment that can be configured to communicate wirelessly, providing a complete signal path between an indoor device and the satellite constellation. Power may also be conveyed wirelessly between the indoor equipment and the outdoor equipment.

The indoor equipment may include communications circuitry for supporting communications with electronic devices. For example, the indoor equipment may have wireless communications circuitry for forming (or otherwise providing one or more capabilities of) a wireless local area network (WLAN) access point. The indoor equipment may also be linked to one or more devices through wired connections.

The outdoor equipment may include satellite communications circuitry. The satellite communications circuitry may include any of antennas, satellite transceiver circuitry, and/or modems. Wireless communications between the indoor and outdoor equipment may be supported using radio-frequency wireless communications circuits and/or optical communications circuits.

During operation, satellite signals received by the satellite communications circuitry can be transmitted digitally to the indoor equipment (e.g., as data packets) using the wireless communications between the indoor and outdoor equipment, e.g., over a wireless interface between the indoor and outdoor equipment. Wireless power that is conveyed from the indoor equipment to the outdoor equipment may be used in powering circuitry, such as the satellite communications circuitry.

DETAILED DESCRIPTION

Figure 1:
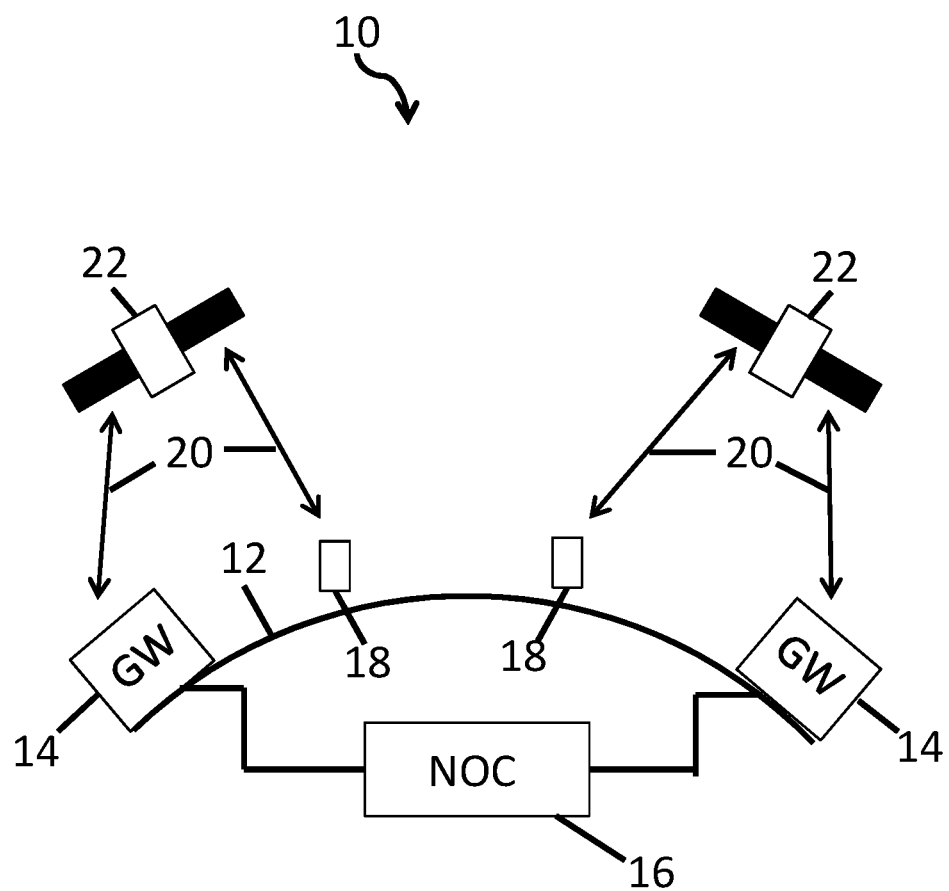
FIG. 1 presents a schematic diagram of an example communications system including satellites, in accordance with some embodiments.

The present disclosure, including the accompanying drawings, is illustrated by way of examples and not by way of limitation.

A communications network may include one or more communications satellites and other equipment, including ground-based communications equipment and user terminals (or user equipment (UE)). One or more of the satellites may be used to deliver wireless services, e.g., to portable electronic devices, home and/or office equipment, and/or other equipment. The wireless services can include any of voice, data, and/or broadcast services, among other services. For example, wireless services can be provided to handheld devices, wearable devices, set-top boxes, access points, hot spot devices, media devices, mobile terminals, computing devices, sensors, etc. In some configurations, services may be delivered to a user satellite terminal in a home or office that is linked by a wired or wireless communications link to further user equipment in the home or office such as a computer, set-top box, or television. For example, equipment used to receive and/or transmit communications through a satellite constellation can include an indoor portion and an outdoor portion. Further, a wireless interface can be established between the indoor portion and the outdoor portion, such that communications and/or power can be transmitted over the wireless interface. Communications and/or power can be transmitted across the wireless interface using one or more of various transmission technologies, such as RF, infrared, inductive coupling, etc.

In some embodiments, the indoor portion can include an electronics housing that includes electronics (digital and/or analog) for processing signals received from a satellite communications network (e.g., via a satellite receiver), for processing signals to be transmitted (e.g., to a satellite and/or terrestrial network), and for supplying power to an outdoor portion of the satellite terminal. The electronics housing can be connected to a power source, such as a power outlet, and also can include one or more communications interfaces, such as WiFi, Ethernet, coaxial cable, powerline communications, etc. Further, the indoor portion can include an indoor module, e.g., connected to the electronics housing through one or more wired and/or wireless connections (e.g., a coaxial connection that carries both communication signals and power), that can be mounted to an interior surface, such as a window or wall, that can be aligned with and outdoor module on a corresponding exterior surface. The indoor module can be configured to wirelessly transmit power to the outdoor module, using any wireless power transfer technique (such as inductive coupling). Further, the indoor module can be configured to wirelessly transmit communication signals to and receive communication signals from the outdoor module, e.g., using radio frequency (RF) signals, optical signals (e.g., laser(s) and/or diode(s) using one or more colors of light), or other such wireless communication technique.

Similarly, the outdoor module can receive the wireless power (e.g., via inductive coupling) and utilize the received power to operate electronics in the outdoor portion. The outdoor module also can transmit to and receive from the indoor module communication signals. The outdoor module can be connected, via a wired or wireless connection, to an outdoor electronics housing that includes one or more communication interfaces, e.g., for bi-directional communication with one or more satellite networks. Further, in some implementations, the outdoor module and/or the outdoor electronics housing can include signal processing electronics for transcoding (or otherwise converting) incoming communication signals received from, e.g., the satellite network, and/or outgoing communication signals received from the indoor module. In some implementations, the indoor electronics housing and/or the indoor module can include signal processing electronics for transcoding (or otherwise converting) incoming communication signals received from the outdoor module, and/or outgoing communication signals received from, e.g., an electronic device communicating with the satellite terminal.

The wireless interface between indoor and outdoor portions can provide numerous advantages, including ease of installation, easy removability, non-permanent installation, and the ability to easily reposition the indoor and/or outdoor portions. For example, the wireless interface can allow the indoor and outdoor portions to be installed such that they can communicate through a window, without having to physically damage or otherwise modify a structure.

An illustrative communications system with satellites is shown in FIG. 1. As shown in FIG. 1, communications system 10 may include one or more constellations of communications satellites 22. Satellites 22 may be placed in any/all of low earth orbit (LEO) (e.g., at altitudes of 500-1500 km or other suitable altitudes), geosynchronous orbit, and/or medium earth orbit (MEO) around the Earth 12. Satellites 22 may form a satellite constellation having one or more sets of satellites with different types of orbits, e.g., that are synchronized with each other to provide user populations (or geographic regions) with desired amounts of coverage. There may be any suitable number of satellites 22 in the satellite constellation(s) of communications system 10 (e.g., 10-100, 1,000-10,000, more than 100, more than 1000, fewer than 10,000, etc.).

Satellites 22 may deliver wireless services to equipment such as electronic devices 18. Electronic devices 18 may include stationary (or less portable) equipment, such as user satellite terminals (e.g., home base stations or office communication equipment) and/or associated equipment such as set-top boxes, routers, televisions, desktop computers, and other electronic equipment (sometimes referred to as user equipment, user terminals, user terminal equipment, etc.). The satellite terminals may be implemented using indoor equipment (an indoor portion) and outdoor equipment (an outdoor portion). The indoor and outdoor equipment associated with a satellite terminal can be communicatively coupled through a wireless interface, e.g., through a window, to permit the transmission of communications and/or power between them. Electronic devices 18 also may include handheld devices and/or other mobile devices, such as cellular telephones, tablet computers, laptop computers, wristwatches and other wearable devices, mobile terminals, drones, robots, mobile hotspots, and other portable electronic devices. Electronic devices 18 may be located anywhere on or above the Earth, e.g., on land, at sea, or in the air. The services provided by satellites 22 may include telephone (voice) service, broadband internet access, media distribution services such as satellite audio (satellite radio and/or streaming audio services) and satellite television (video), data communications, location, and/or other services.

System 10 may include one or more network operations centers (NOCs) such as NOC 16, which can be coupled to one or more gateways (GW), e.g., gateways 14 (sometimes referred to as ground stations). If desired, network operations can be managed using equipment at gateways 14, using equipment distributed throughout system 10, using multiple network operation centers 16 and/or other suitable equipment (e.g., servers or other control circuitry). The use of a network operations center such as NOC 16 of FIG. 1 is merely illustrative. In some configurations, clusters of gateways 14 and/or other equipment may share resources (e.g., gateways 14 in a metropolitan area may share a bank of modems located at one of the gateways 14 or other locations).

There may be any suitable number of gateways 14 in system 10 (e.g., 1-100, more than 10, more than 100, fewer than 1000, etc.). Gateways 14 may have transceivers that allow the gateways to transmit wireless signals to satellites 22 over wireless links 20 and that allow the gateways to receive wireless signals from satellites 22 over wireless links 20. Wireless links 20 may also be used to support communications between satellites 22 and electronic devices 18. During media distribution operations, for example, a gateway 14 may send traffic over an uplink (one of links 20) to a given satellite 22 that is then routed via a downlink (one of links 20) to one or more electronic devices 18. Gateways 14 may perform a variety of services, including supplying media for electronic devices 18, routing telephone calls (e.g., voice and/or video calls) between electronic devices 18 and/or other equipment, providing electronic devices 18 with internet access, and/or delivering other communications and/or data services to electronic devices 18. Gateways 14 may communicate with each other via satellites 22 and/or using ground-based communications networks.

NOC 16 may be used to manage the operations of one or more gateways 14 and/or the operations of one or more satellites 22. For example, NOC 16 may monitor network performance and take appropriate corrective actions if warranted. During these operations, NOC 16 may update software for one or more satellites 22 and/or electronic devices 18, may adjust satellite 22 altitude and/or other orbital parameters, may direct one or more satellites 22 to perform operations to adjust satellite solar panels and/or other satellite components, and/or may otherwise control and maintain one or more of the satellites 22 in the constellation of satellites orbiting the Earth 12. Further, in some embodiments, NOC 16 also may be configured to perform maintenance operations on one or more gateways 14.

Gateways 14, satellites 22, NOC 16, and electronic devices 18 may be configured to support encrypted communications. For example, NOC 16 and gateways 14 may communicate using encrypted communications. Similarly, gateways 14, satellites 22, and electronic devices 18 may communicate using encrypted communications. This allows NOC 16 to issue secure commands and to receive secure information when communicating with gateways 14, satellites 22, and/or electronic devices 18. The use of encrypted communications within system 10 also allows electronic devices 18 to securely communicate with each other and with gateways 14, and also allows gateways 14 to securely distribute media and/or other information to electronic devices 18, e.g., in compliance with digital protection requirements.

During operation of communications system 10, satellites 22 may serve as orbiting relay stations. For example, when a gateway 14 transmits a wireless uplink signal, one or more satellites 22 may forward these signals as downlink signals to one or more electronic devices 18. In some embodiments, some electronic devices 18 may be receive-only devices while other electronic devices 18 may support bidirectional communications with satellites. In scenarios in which an electronic device 18 supports bidirectional communications, an electronic device 18 may transmit wireless signals to one or more satellites 22, so that the one or more satellites 22 may relay this information to one or more appropriate destinations (e.g., gateways 14, other electronic devices 18, etc.).

Satellites 22 and links 20 may support any suitable satellite communications bands (e.g., IEEE bands), such as the L-band (1-2 GHz), S-band (2-4 GHz), C-band (4-8 GHz), Ka-band (27-40 GHz), V-band (40-75 GHz), W-band (75-110 GHz), and/or other bands suitable for space communications (e.g., frequencies above 1 GHz, below 110 GHz, and/or other suitable frequencies).

Some frequencies (e.g., C-band frequencies and other low frequencies such as L-band and S-band frequencies) may penetrate buildings and may therefore be suitable for communicating with electronic devices located indoors at least some of the time, e.g., handheld electronic devices 18 (e.g., devices that are mobile and that may sometimes be indoors and may sometimes be outdoors) and/or electronic devices 18 without an external antenna/receiver. Other frequencies (e.g., V-band frequencies and other high frequencies such as Ka-band and W-band frequencies) do not readily (or effectively) penetrate buildings and may therefore be suitable for communicating with electronic devices 18 that have an external antenna/receiver or that are located outdoors and/or otherwise have a line-of-sight path to satellites 22. A satellite terminal, e.g., an electronic device 18, that includes an external portion can be configured to receive signals in any of one or more frequency bands and to relay the received signals to a corresponding indoor portion. Further, the outdoor portion of a satellite terminal, e.g., an electronic device 18, can be configured to transmit signals in any of one or more frequency bands, including converting between frequencies for reception and/or transmission. To accommodate a variety of scenarios, e.g., both mobile device scenarios and home/office scenarios, satellites 22 may, for example, include C-band satellites (or other low band satellites such as L-band or S-band satellites), V-band satellites (or other high band satellites such as Ka-band or W-band satellites) and/or dual-band satellites (e.g., satellites that that support C-band and V-band communications or other low and high band communications).

Figure 2:
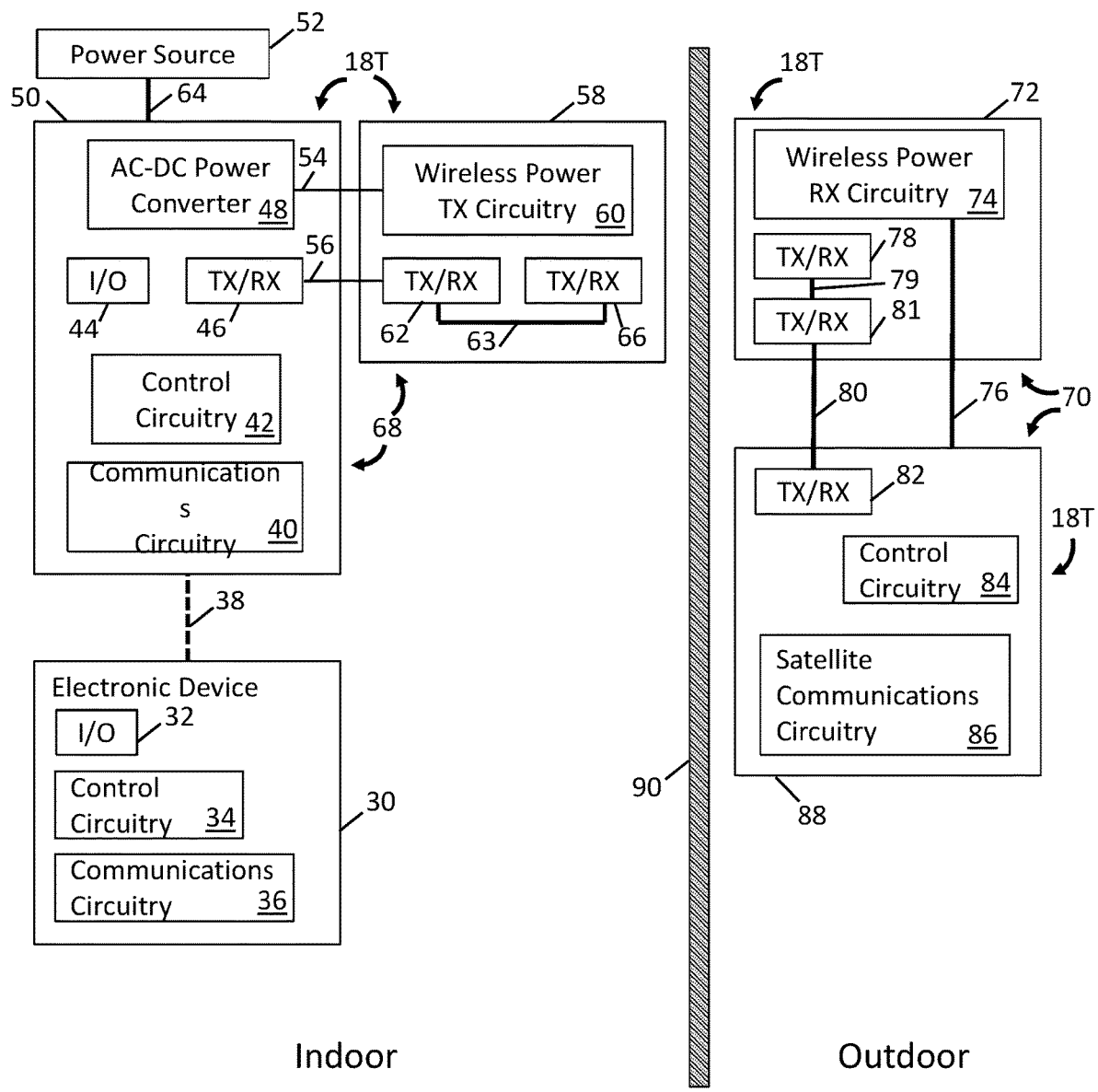
FIG. 2 presents a schematic diagram of an example of a satellite terminal having linked indoor and outdoor units in communication with an electronic device of a user, in accordance with some embodiments.

FIG. 2 presents a schematic diagram of an illustrative satellite terminal for a home, office, or other location. Satellite terminal 18T, which may sometimes be referred to as satellite terminal equipment, a satellite receiver, or user satellite equipment, etc. may serve as one of devices 18 of FIG. 1. As shown in FIG. 2, terminal 18T may have multiple portions such as indoor equipment 68 and outdoor equipment 70. In some embodiments, indoor equipment 68 may transfer power wirelessly to outdoor equipment 70 through barrier 90. In some other embodiments, outdoor equipment 70 can be, at least partially, separately powered, e.g., through an exterior electrical source, a solar source, etc. Further, in some embodiments, barrier 90 may be a glass window or any other transparent window or other such barrier, e.g., in a home or office. In some other embodiments, barrier 90 may be an opaque window, a wall, a panel, a pane, or any other opaque obstruction. During operation, indoor equipment 68 and outdoor equipment 70 may communicate wirelessly through barrier 90 (e.g., using wireless communications such as radio-frequency communications or optical communications).

Outdoor equipment 70 may include a first portion, such as outdoor main unit 88, and a second portion, such as outdoor power and communications unit 72. In some other implementations, outdoor equipment 70 can be configured in a single portion or in three or more portions. The circuitry of outdoor equipment 70 may be mounted in one or more weatherized housings. For example, unit 88 may be an outdoor unit with a weatherized housing suitable for mounting on a roof or other outdoor location and outdoor power and communications unit 72 may be an outdoor unit with a weatherized housing suitable for mounting on or near barrier 90 (e.g., using adhesive, screws or other fasteners, mounting brackets, suction cups, clips, magnets, and/or other mounting structures).

Indoor equipment 68 may include a first portion, such as indoor main unit 50, and a second portion, such as indoor power and communications unit 58. Indoor main unit 50 and indoor power and communications unit 58 may be mounted in (or otherwise configured in) one or more housings suitable for installation indoors. For example, indoor main unit 50 and indoor power and communications unit 58 can be configured in housings that are not weatherized or otherwise adapted for external (or wet) installation. In some other embodiments, however, one or more portions of indoor equipment 68 also can be configured in weatherized housing or other such cabinets that facilitate at least temporary outdoor use. Indoor power and communications unit 58 may be mounted on an opposing side of barrier 90 from outdoor power and communications unit 72 or in another suitable location that facilitates wireless power transfer from indoor power and communications unit 58 to outdoor power and communications unit 72 and wireless communications between indoor unit 58 and outdoor unit 72.

Indoor main unit 50 may obtain power from any power source, such as a wall outlet, a battery, or other power source. As shown in FIG. 2, for example, unit 50 may have a power adapter such as alternating-current (AC) to direct-current (DC) power converter 48 that receives alternating current power from power source 52 (e.g., a mains power supply through a socket or outlet) over power cable 64. AC-DC power converter 48 may convert alternating-current power from power source 52 to direct-current power (as an example) and may supply this power to one or more components of indoor main unit 50 as well as to wireless power transmitting circuitry 60 and other circuitry in unit 58 via path 54 (e.g., a wired path, such as a cabled connection). Wireless power transmitting circuitry 60 can transmit the power received from path 54 wirelessly through barrier 90 to wireless power receiving circuitry 74 in outdoor power and communications unit 72. Wireless power receiving circuitry 74 may convert wireless power signals received from wireless power transmitting circuitry 60 into direct-current power for use by circuitry in unit 72. Wireless power receiving circuitry 74 may also supply direct current power to unit 88 over wired path 76. Outdoor main unit 88 may use the power received over path 76 in powering the circuitry of unit 88. If desired, outdoor main unit 88 may have an optional direct current power cord (e.g., connected to a solar panel or array) or an alternating-current power cord and power adapter for receiving alternating-current power (e.g., form an outdoor outlet) and locally converting this power to direct-current power.

Outdoor main unit 88 may include satellite communications circuitry 86 for communicating with one or more satellites 22 (FIG. 1) of a satellite constellation. Satellite communications circuitry 86 may include any of antennas, satellite transceiver circuitry, and/or modems for supporting satellite communications with satellites 22.

In some implementations, satellite communications circuitry 86 may include one or more phased antenna arrays formed from sets of antennas and from adjustable circuitry, such as adjustable phase delay circuits and/or adjustable gain circuits (e.g., circuits for selectively adjusting signal phase and amplitude for incoming and/or outgoing signals for each antenna in the phased antenna arrays and thereby steering phased antenna array beams). The antenna beams (signal beams) that are formed by the phased antenna arrays may be used for transmitting signals and/or receiving signals, and may all be pointed at the same satellite 22 and/or may be pointed at different satellites. For example, signals may be received using a beam pointed at one satellite while signals are being transmitted using another beam (e.g., a beam pointed at the same satellite or another satellite). During operation, phased antenna arrays or other antenna structures in satellite communications circuitry 86 may be steered to track multiple satellites 22 (e.g., non-geostationary satellites) as they traverse different orbits. The antennas of satellite communications circuitry 86 may include any of monopoles, dipoles, and/or other types of antenna elements (e.g., loop antennas, helical antennas, patch antennas, inverted-F antennas, Yagi antennas, slot antennas, horn antennas, cavity antennas, dish antennas, or other suitable antennas).

Satellite transceiver circuitry in satellite communications circuitry 86 may be coupled (communicatively) to the antennas. One or more modems in satellite communications circuitry 86 may be coupled (communicatively) to the satellite transceiver circuitry and may use the satellite transceiver circuitry and antennas to transmit and receive satellite communications. The modems, satellite transceiver circuitry, and antennas may be configured to handle any suitable type of satellite communications. For example, satellite communications circuitry 86 may handle satellite communications in bands such as any of the L-band (1-2 GHz), S-band (2-4 GHz), C-band (4-8 GHz), Ka-band (27-40 GHz), V-band (40-75 GHz), W-band (75-110 GHz), and/or other bands suitable for space communications (e.g., frequencies above 1 GHz, below 110 GHz, and/or other suitable frequencies).

Satellite communications circuitry 86 may be coupled to communications circuit 82 and may be controlled using control circuitry 84. Communications circuit 82 may be or may include a wired communications circuit with a digital data transmitter and a digital data receiver, or other transmitter and/or receiver circuitry. Communications circuit 82 may communicate with communications circuit 81 over wired communications path 80. Communications circuit 81 may include a wired communications transmitter for transmitting data (e.g., digital data) over path 80 and may include a wired communications receiver for receiving data over path 80.

Path 80 and path 76 may be separate wired paths (e.g., separate cables) or may be formed from (or within) the same physical cable. For example, the outer ground conductor and center signal conductor of a coaxial cable may be used to form a direct-current power path such as path 76 while also serving as a signal path (path 80) for wired communications between communications circuit 82 and communications circuit 81.

Communications circuit 81 and communications circuit 78 may communicate internally in outdoor power and communications unit 72 (e.g., over a digital communications path such as a bus or other wired internal communications path 79). Communications circuit 78 may be a wireless communications circuit for communicating wirelessly with wireless communications circuit 66. For example, communications circuit 78 may establish one or more wireless communications links with wireless communications circuit 66 through barrier 90, such as a window.

During operation, modems in satellite communications circuitry 86 may receive data (e.g., digital data) from communications circuit 82 (which, in turn, received this data from communications circuit 81) and may provide corresponding outgoing data signals to satellite transceiver circuitry and satellite antennas (e.g., a phased antenna array) in satellite communications circuitry 86 for transmission to one or more satellites. When satellite signals are received by the satellite antennas and satellite transceiver circuitry in satellite communications circuitry 86, the modems of circuitry 86 may produce digital data from these received signals and may transmit this data to communications circuit 81 over path 80 using communications circuit 82. Modems in satellite communications circuitry 86 may provide sufficient modem capacity to handle multiple communications sessions. In this way, satellite communications hardware may be housed primarily or exclusively in outdoor main unit 88, while outdoor power and communications unit 72 may serve as a wireless communications module (and wireless power reception circuit) for supporting communications with indoor power and communications unit 58 of indoors equipment 68 through barrier 90.

Satellite communications circuitry 86 may, if desired, be configured to simultaneously receive multiple media streams such as two more, three or more, or four or more broadcast television channels from one or more satellites, to handle simultaneous television sessions and voice/internet sessions, to handle one or more voice calls and/or one or more internet sessions while simultaneously receiving multiple broadcast television streams, to receive on-demand media streams, to receive data while transmitting data, etc.

Indoor main unit 50 may include input-output devices 44 for receiving input from a user and/or for providing output, e.g., to a user. Control circuitry 42 may be included in indoor main unit 50 to control the operation of unit 50 and/or communications unit 58. Communications circuitry 40 may include wired communications circuitry such as a network interface for supporting Ethernet communications or other wired communications and/or wireless communications circuitry (e.g., wireless local area network circuitry such as WiFi® access point circuitry operating at 2.4 GHz, 5 GHz, 60 GHz, and/or other suitable wireless local area network frequencies). Communications circuitry 40 may be used to form one or more communications links, such as link 38 with one or more user devices, such as electronic device 30.

Electronic device 30 may be any device, such as a tablet computer, cellular telephone, laptop computer, desktop computer, television, set-top box, internet-connected voice-controlled speaker, wristwatch, gaming unit, and/or other user equipment. Electronic device 30 may include communications circuitry 36 for supporting communications over link 38. Link 38 may be, for example, a wired link such as an Ethernet link or other wired path and/or may be a wireless communications link (e.g., a wireless local area network link such as a WiFi® link at 2.4 GHz, 5 GHz, 60 GHz, and/or other suitable wireless local area network frequencies). Communications circuitry 36 may include wired communications circuitry (e.g., a network interface for supporting Ethernet communications) and/or may include wireless communications circuitry (e.g., antennas and wireless transceiver circuitry such as wireless local area network transceiver circuitry) for supporting communications with antennas and transceiver circuitry in communications circuitry 40 of indoor main unit 50 over link 38. Electronic device 30 may include control circuitry 34 for supporting the operation of device 30 and input-output devices or interfaces 32 for gathering input and for providing output, e.g., to/from a device user.

Control circuitry 34, 42, and 84 may include storage, such as solid-state drives, random-access memory, and/or hard disk drives and other volatile and/or nonvolatile memory. Control circuitry 34, 42, and 84 may also include one or more microcontrollers, microprocessors, digital signal processors, communications circuits with processors, application specific integrated circuits, programmable logic devices, field programmable gate arrays, and/or other processing circuitry. During operation, control circuitry 34, 42, and 84 may run code (instructions) from storage in control circuitry 34, 42, and 84 to implement desired functions for device 30 and terminal 18T. For example, control circuitry in terminal 18T may control operations such as tuning operations (e.g., for channel selection), controlling of the modulation and demodulation operations of modems in satellite communications circuitry 86, antenna beam steering using phased antenna arrays in circuitry 86, controlling of over-the-air signaling protocols for network access and terminal management, etc. Control circuitry in terminal 18T may be used in processing user commands obtained using input-output devices 44 or from input-output devices 32 in device 30 and/or may be used in performing other control operations for terminal 18T. As an example, control circuitry 42 may be configured to perform operations such as network (packet) routing functions (e.g., so that indoor equipment 68 may serve as a network router), may perform firewall operations (e.g., to enhance internet access security by allowing indoor equipment 68 to serve as a firewall), may be configured to use communications circuitry 40 to form a wireless access point (e.g., a WiFi® access point), and/or may be used to store media (e.g., so that indoor equipment 68 serves as a digital video recorder (DVR) that allows a user to record television programs, to store downloaded media for future playback, to perform temporary buffering functions, etc.).

Input-output devices 44 and 32 may include one or more of buttons, switches, touch pads, touch screens, microphones, and/or other input devices for gathering input from a user (e.g., channel change commands, media selection commands, volume adjustment commands, etc.) and may provide corresponding control commands to outdoor equipment 70. Control circuitry 34 may receive information from terminal 18T (e.g., via link 38) and may use this information in supplying electronic device 30 (or a user thereof) with output (e.g., by displaying video on a display in input-output devices 32, by playing audio through a speaker in devices 32, and/or by otherwise supplying a user with voice call information, internet browsing information, television content, and/or other content such as video, audio, text, graphics, etc.). If desired, some or all of the circuitry of indoor equipment 68 may be integrated into electronic device 30 (e.g., a television, computer, set-top box, etc.).

Indoor main unit 50 and indoor power and communications unit 58 may communicate over wired path 56 using communications circuit 46 and using communications circuit 62, respectively. Communications circuits 46 and 62 may each include a transmitter for transmitting digital data over path 56 and may include a receiver for receiving digital data over path 56. Wired power (e.g. direct-current power) may be transmitted from AC-DC power converter 48 to wireless power transmitting circuitry 60 over path 54. Path 54 and path 56 may be separate wired paths (e.g., separate cables) or may be formed from the same physical cable. For example, the outer ground conductor and center signal conductor of a coaxial cable may be used to form a direct-current power path, such as path 54, while also serving as a signal path (path 56) for wired communications between communications circuit 46 and communications circuit 62.

Communications circuit 62 and communications circuit 66 may communicate internally in unit 58 (e.g., over a digital communications path such as a bus or other internal wired communications path 63). Communications circuit 66 may be a wireless communications circuit for communicating wirelessly with wireless communications circuit 78. A wireless transmitter in communications circuit 66 may wirelessly transmit data signals to a corresponding wireless receiver in communications circuit 78. A wireless transmitter in circuit 78 may wirelessly transmit data signals to a corresponding wireless receiver circuit in wireless communications circuit 66. In this way, wireless communications circuits 66 and 78 may support bidirectional wireless communications through barrier 90.

Because both wireless power and wireless communications signals may be transmitted through barrier 90, no opening in barrier 90 is required to facilitate installation. For example, it is not necessary to drill (or otherwise make) holes in barrier 90 or to perform other potentially cumbersome operations to couple outdoor equipment 70 with indoor equipment 68 to form terminal 18T. In some configurations, power transmitting components and/or wireless communications components may benefit from alignment. If desired, alignment marks may be formed on indoor power and communications unit 58 and/or outdoor power and communications 72 to facilitate visual alignment. Terminal 18T (e.g., unit 58 and/or indoor main unit 50 and/or other circuitry in terminal 18T) and/or electronic device 30 may also be used in providing a user with audible feedback (e.g., variable frequency tones, periodic tones that change in period, synthesized voice, etc.), visual feedback (e.g., on-screen content such as text, directional arrows, or other visible information), haptic feedback (e.g., vibrations, etc.) and/or other alignment feedback indicative of alignment quality. Terminal 18T (e.g., indoor power and communications unit 58 and/or outdoor power and communications unit 72) may contain alignment sensors (e.g., magnetic sensors, optical sensors, electrical sensors, and/or other sensors or combinations of sensors) that provide terminal 18T with real-time information on the quality of alignment between units 58 and 72. This alignment sensor information may be used by terminal 18T in providing a user with dynamic feedback on alignment quality. For example, if sensors, e.g., magnetic sensors, in units 58 and/or 72 detect that alignment quality is increasing as a user moves either or both of units 58 and 72 with respect to the other, a tone generator frequency or other feedback signal may be adjusted in proportion to the increasing quality of the alignment to alert the user. By providing feedback to facilitate good alignment between indoor power and communications unit 58 and outdoor power and communications unit 72, communication and/or power transfer performance in terminal 18T can be maintained at a sufficient level to support system operation, e.g., at or above a predetermined level. Further, the alignment of units 58 and 72 can be evaluated over time (e.g., periodically or continuously) to determine whether the alignment has degraded such that it impacts system performance and, if system performance is impacted, feedback can be output indicating that realignment should be performed.

Figure 3:
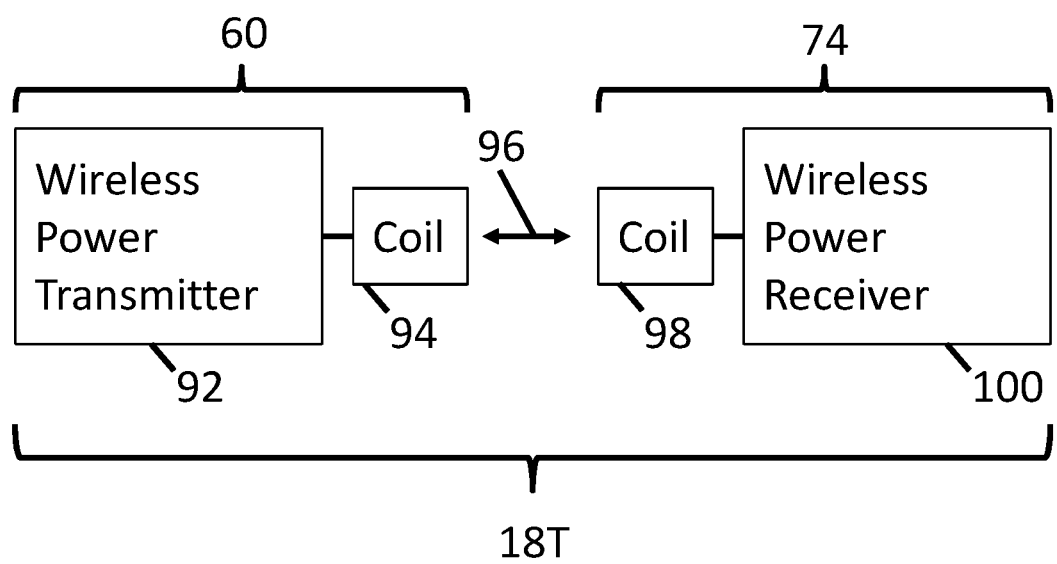
FIG. 3 presents a schematic diagram of illustrative wireless power components, in accordance with some embodiments.

Illustrative wireless power circuitry for conveying power through barrier 90 is shown in FIG. 3. As shown in FIG. 3, terminal 18T may include wireless power transmitting circuitry 60 that transmits wireless power signals 96 to wireless power receiving circuitry 74. Power may be transmitted wirelessly, e.g., over a distance of 1 mm to 10 mm, over a distance of 1 mm to 100 mm, over a distance of at least 1 mm, at least 1 cm, or at least 100 cm, over a distance of less than 100 cm, less than 10 cm, or less than 3 cm, or other suitable distance. Wireless power may be transmitted through capacitive coupling, near-field transmission (e.g., using a patch antenna(s) or other antenna(s) in circuitry 60 and a corresponding patch antenna(s) or other antenna(s) in circuitry 74), and/or using other suitable wireless power transmission configurations. Power may be transmitted at a frequency of 10 kHz to 1 MHz, at least 100 kHz, at least 1 MHz, at least 1 GHz, less than 10 GHz, less than 5 GHz, less than 1 MHz, less than 500 kHz, or other suitable frequency. In the illustrative configuration of FIG. 3, wireless power transmitting circuitry 60 includes a wireless power transmitter circuit such as wireless power transmitter 92 (e.g., a transmitter with an oscillator and output circuit at the transmit frequency) that transmits inductive wireless power through one or more coils (inductors) such as coil 94 and wireless power receiving circuitry 74 includes a corresponding wireless power receiver circuit (e.g., a rectifier) such as wireless power receiver 100 that receives the transmitted wireless power signals 96 using one or more coils, such as coil 98. In some embodiments, the efficiency of the wireless power transfer between wireless power transmitting circuitry 60 and wireless power receiving circuitry 74 can be monitored, e.g., periodically or continuously. If the efficiency falls below a predetermined level, an indication can be provided that one or more components of circuitry 60 and/or 74 should be realigned. Additionally or alternatively, if the efficiency falls below a predetermined level, one or more configuration changes can be implemented, such as one or more of switching to a different frequency, switching to additional or different coils/antennas, etc.

Figure 4:
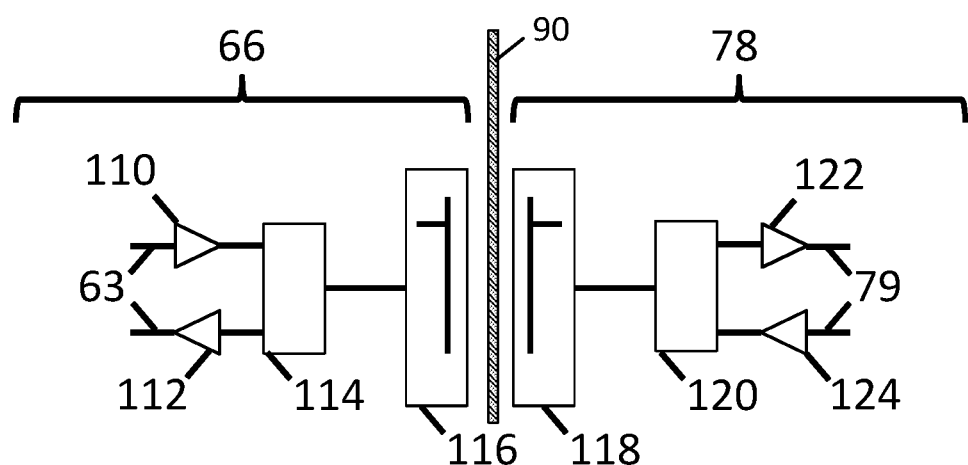
FIG. 4 presents a schematic diagram of illustrative wireless communications circuitry based on radio-frequency components, in accordance with some embodiments.
Figure 5:
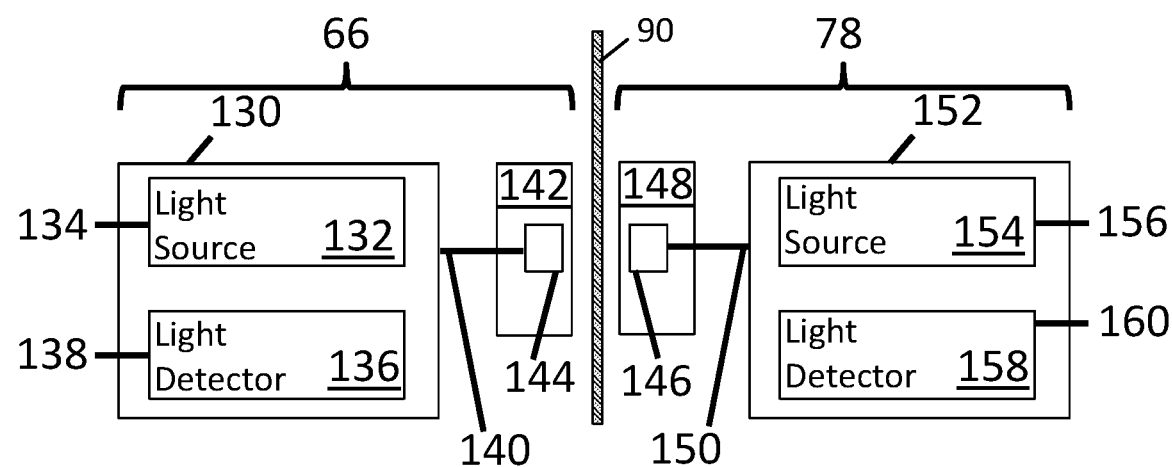
FIG. 5 presents a schematic diagram of illustrative wireless communications circuitry based on optical components, in accordance with some embodiments.

Illustrative wireless communications circuitry for conveying wireless communications signals through barrier 90 is shown in FIGS. 4 and 5. Wireless communications through barrier 90 may involve communications over any suitable distance (e.g., over a distance of 1 mm to 10 mm, over a distance of 1 mm to 100 mm, over a distance of at least 1 mm, at least 1 cm, at least 10 cm, or at least 100 cm, over a distance of less than 100 cm, less than 10 cm, or less than 3 cm, or other suitable distance). In the example of FIG. 4, wireless communications circuit 66 and wireless communications circuit 78 are radio-frequency wireless communications circuits. In the example of FIG. 5, wireless communications circuit 66 and wireless communications circuit 78 are optical wireless communications circuits. In general, any suitable type (or combination of types) of wireless communications may be used in conveying signals through barrier 90. Optional configurations in which communications between indoor power and communications unit 58 and outdoor power and communications unit 72 are performed using a wired link (e.g., while power is transmitted wirelessly using circuits 60 and 74) or in which power transmission between unit 58 and 72 is performed using a wired link (e.g., while communications between unit 58 and 72 are handled wirelessly) may also be used, if desired.

In the illustrative configuration of FIG. 4, wireless communications circuit 66 includes a transmitter such as transmitter 110 and a receiver such as receiver 112. A coupler (e.g., a duplexer) such as coupler 114 may be used to route signals between transmitter 110 and antenna 116 and to route signals from antenna 116 to receiver 112 (e.g., based on signal frequency) or, if desired, transmitter 110 and receiver 112 may transmit and receive at different times. Transmitter 110 may receive signals from path 63 and may transmit corresponding information wirelessly using antenna 116. Wirelessly received signals from antenna 116 may be received by receiver 112 and provided to path 63. Wireless communications circuit 78 includes a transmitter such as transmitter 124 and a receiver such as receiver 122. A coupler (e.g., a duplexer) such as coupler 120 may be used to route signals between transmitter 124 and antenna 118 and to route signals from antenna 118 to receiver 122 or transmitter 124 and receiver 122 may be configured to transmit and receive at different times. Transmitter 124 may receive signals from path 79 and may transmit corresponding information wirelessly using antenna 118 (e.g., information to be received wirelessly at antenna 116). Wirelessly transmitted signals from antenna 116 that have been received by antenna 118 may be received by receiver 122 and provided to path 79. Antennas 116 and 118 may be patch antennas or other suitable antennas (or combinations of antennas). Wireless communications may take place at any suitable communications frequency (e.g., a frequency of 100 MHz to 100 GHz, at least 1 GHz, 2.4 GHz, 5 GHz, 60 GHz, 94 GHz, 40-100 GHz, less than 100 GHz, or other suitable frequency). For example, one or more communications frequencies can be selected based on properties of barrier 90, e.g., as assessed during an optional configuration procedure. One or more frequencies and/or device configurations can be evaluated and the frequencies/configurations delivering sufficient performance can be identified. One or more frequencies/configurations can then be selected for operation.

In the illustrative configuration of FIG. 5, wireless communications circuit 66 includes optical device(s) 130, one or more fibers, such as optical fiber 140, and lens unit 142. Wireless communications circuit 78 includes optical device(s) 152, optical fiber 150, and lens unit 148. Lens units 142 and 148 may be aligned with each other on opposing sides of a transparent (or semi-transparent) barrier (e.g., a window or other barrier 90) so that light that is emitted from fiber 140 through lens(es) 144 of lens unit 142 is coupled into fiber 150 by lens(es) 146 of lens unit 148 and vice versa. Configurations in which optical devices 130 and 152 are optically coupled for bidirectional communications without using fibers 140 and/or 150 and/or without using lens units 144 and 146 coupled to fibers 140 and 150 may be used if desired. The arrangement of FIG. 5 is illustrative.

As shown in FIG. 5, optical device(s) 130 may include an optical transmitter, such as light-source 132 (e.g., one or more lasers or light-emitting diodes configured to operate at one or more wavelengths) and an optical receiver, such as light detector 136 (e.g., one or more photodiodes). An optical coupler may be used to couple light emitted from light source 132 into fiber 140 and may be used to couple light from fiber 140 that has been received from circuit 78 into light detector 136. Light source 132 may receive electrical signals from path 134 and may transmit corresponding light signals on fiber 140. The transmitted light signals in fiber 140 are transmitted by lens unit 142 through barrier 90 to lens unit 148. After passing through fiber 150, light detector 158 in optical device(s) 152 may detect these light signals. Light detector 136 may similarly receive optical signals that have been transmitted from light source 154 in optical device(s) 152 via optical fiber 150, units 148 and 142, and optical fiber 140 to path 138.

The light signals conveyed between circuits 66 and 78 may be visible light signals, infrared light signals, or other light signals, and may include signals at one or more wavelengths (e.g., a single wavelength or 2-10 wavelengths for a wavelength division multiplexing configuration).

The wireless links of FIGS. 4 and 5 may be bidirectional communications links involving analog signals (e.g., radio-frequency signals, analog light signals) and/or digital data (e.g., digital data packets). For example, communications circuits 66 and 78 may support bidirectional digital communications and may communicate through barrier 90 (e.g., transmitting and receiving digital data packets) at data rates of at least 100 Mbps, at least 500 Mbps, at least 1 Gbps, less than 100 Gbps, or other suitable data rate.

In accordance with an embodiment, a satellite terminal configured to communicate wirelessly with a satellite constellation is provided that includes outdoor equipment including, satellite communications circuitry configured to receive signals from at least one satellite, and wireless power receiving circuitry configured to wirelessly receive power for the satellite communications circuitry, and indoor equipment, separated from the outdoor equipment by an intervening barrier, including, wireless power transmitting circuitry that is configured to wirelessly transmit power through the intervening barrier to the wireless power receiving circuitry.

In accordance with another embodiment, the indoor equipment includes a first wireless communications circuit and the outdoor equipment includes a second wireless communications circuit configured to wirelessly transmit communications signals corresponding to the received signals to the first wireless communications circuit.

In accordance with another embodiment, the first and second wireless communications circuits are configured to communicate at a data rate of between 100 Mbps and 10 Gbps.

In accordance with another embodiment, the first wireless communications circuit includes a first radio-frequency transmitter, a first radio-frequency receiver, and a first antenna communicatively coupled to the first radio-frequency transmitter and the first radio-frequency receiver and the second communications circuit includes a second radio-frequency transmitter, a second radio-frequency receiver, and a second antenna communicatively coupled to the second radio-frequency transmitter and the second radio-frequency receiver.

In accordance with another embodiment, the first wireless communications circuit includes a first light source and a first light detector and the second wireless communications circuit includes a second light source and a second light detector.

In accordance with another embodiment, the satellite terminal includes at least one optical fiber through which light emitted from the first light source passes to reach the second light detector.

In accordance with another embodiment, the first light source is configured to operate at multiple wavelengths and the second light detector is configured to detect light emitted by the first light source after passing through a glass window pane.

In accordance with another embodiment, the outdoor equipment includes first and second outdoor units, the satellite communications circuitry is housed in the first outdoor unit and the wireless power receiving circuitry and the second wireless communications circuit are housed in the second outdoor unit.

In accordance with another embodiment, the indoor equipment includes first and second indoor units.

In accordance with another embodiment, the first indoor unit includes the wireless power transmitting circuitry.

In accordance with another embodiment, the first indoor unit includes the first wireless communication circuit.

In accordance with another embodiment, the satellite terminal includes a first cable coupling the first and second indoor units and a second cable coupling the first and second outdoor units.

In accordance with another embodiment, the second indoor unit includes wireless communications circuitry configured to form a wireless local area network access point.

In accordance with another embodiment, the second indoor unit includes a power converter configured to provide power to the wireless power transmitter over the first cable.

In accordance with an embodiment, an apparatus is provided that includes satellite communications circuitry, first and second wireless communications circuits, the first wireless communications circuit is configured to wirelessly transmit information received from the satellite communications circuitry to the second wireless communications circuit, wireless power transmitting circuitry configured to transmit wireless power signals, and wireless power receiving circuitry configured to receive the wireless power signals and provide corresponding power to the satellite communications circuitry.

In accordance with another embodiment, the wireless power transmitting circuitry includes a first coil and a wireless power transmitter configured to transmit the wireless power signals with the first coil and the wireless power receiving circuitry includes a second coil and wireless power receiver configured to receive the wireless power signals with the second coil.

In accordance with another embodiment, the apparatus includes a first cable, a power converter configured to provide power to the wireless power transmitting circuitry over the first cable, first and second communications circuits that communicate digitally over the first cable, a second cable, the wireless power receiving circuitry is configured to provide power to the satellite communications circuitry over the second cable, and third and fourth communications circuits that communicate digitally over the second cable.

In accordance with an embodiment, satellite terminal equipment is provided that includes outdoor equipment including first and second outdoor units coupled by a cable, satellite communications circuitry in the first outdoor unit that is configured to transmit information to a first wireless communications circuit in the second outdoor unit over the cable, and indoor equipment having a second wireless communications circuit that is configured to wirelessly receive signals from the first wireless communications circuit.

In accordance with another embodiment, the indoor equipment includes third wireless communications circuitry configured to form a wireless local area network access point and the third wireless communications circuitry is configured to receive information from the second wireless communications circuit over an additional cable.

In accordance with another embodiment, the satellite terminal equipment includes wireless power transmitting circuitry in the indoor equipment, and wireless power receiving circuitry in the outdoor equipment that is configured to receive wireless power from the indoor equipment.

The foregoing is merely illustrative and various modifications can be made to the described embodiments. The foregoing embodiments may be implemented individually or in any combination.

What is claimed is:

1. A satellite terminal configured to communicate wirelessly with a satellite constellation, the satellite terminal comprising:
    wireless power receiving circuitry configured to receive, through an intervening barrier, wireless power transmitted by wireless power transmitting circuitry;
    a communications circuit configured to transmit, through the intervening barrier, communications signals corresponding to signals received by the satellite terminal from at least one satellite in the satellite constellation; and
    a housing having a mounting structure configured to mount the housing to the intervening barrier, wherein the communications circuit and the wireless power receiving circuitry are located within the housing.

2. The satellite terminal defined in claim 1, wherein the mounting structure comprises an adhesive.

3. The satellite terminal defined in claim 1, wherein the mounting structure comprises a screw.

4. The satellite terminal defined in claim 1, wherein the mounting structure comprises a mounting bracket.

5. The satellite terminal defined in claim 1, wherein the mounting structure comprises a suction cup.

6. The satellite terminal defined in claim 5, wherein the intervening barrier comprises glass.

7. The satellite terminal defined in claim 6, wherein the communications circuit comprises a light source, an optical fiber coupled to the light source, and a lens coupled to the optical fiber, wherein the light source is configured to, via the optical fiber and the lens, transmit the communications signals at an optical wavelength through the glass.

8. The satellite terminal defined in claim 1, wherein the mounting structure comprises a clip.

9. The satellite terminal defined in claim 1, wherein the mounting structure comprises a magnet.

10. The satellite terminal defined in claim 1, wherein the intervening barrier comprises a barrier selected from the group consisting of: a wall of a building and a window.

11. The satellite terminal defined in claim 1, wherein the communications circuit comprises an antenna configured to transmit the communications signals through the intervening barrier at a frequency between 40 GHz and 100 GHz.

12. A satellite terminal configured to communicate wirelessly with a satellite constellation, the satellite terminal comprising:
    wireless power transmitting circuitry configured to transmit, through a window, wireless power to wireless power receiving circuitry;
    a communications circuit configured to receive, through the window, optical signals corresponding to radio-frequency signals received by the satellite terminal from at least one satellite in the satellite constellation; and
    a housing having a mounting structure configured to mount the housing to the window, wherein the communications circuit and the wireless power transmitting circuitry are at least partially located within the housing.

13. The satellite terminal defined in claim 12, wherein the communications circuit comprises a lens configured to receive the optical signals through the window, an optical fiber coupled to the lens, and a light detector coupled to the optical fiber, wherein the light detector is configured to receive the optical signals through the optical fiber.

14. The satellite terminal defined in claim 13, further comprising:
    a light source coupled to the optical fiber.

15. The satellite terminal defined in claim 12, wherein the mounting structure comprises a mounting structure selected from the group consisting of: a suction cup, an adhesive, and a magnet.

16. The satellite terminal defined in claim 12 further comprising:
    an additional housing that is separate from the housing;
    a power converter at least partially located in the additional housing; and
    a cable that couples the power converter to the wireless power transmitting circuitry.

17. A satellite terminal configured to communicate wirelessly with a satellite constellation, the satellite terminal comprising:
    a first housing configured to be mounted to a first side of a barrier;
    a second housing configured to be mounted to a second side of the barrier;
    a first communications circuit in the first housing and configured to transmit signals through the barrier while the first housing is mounted to the barrier, wherein the transmitted signals correspond to signals received from at least one satellite in the satellite constellation;
    a second communications circuit in the second housing and configured to receive the transmitted signals through the barrier while the second housing is mounted to the barrier; and
    an alignment sensor, wherein the alignment sensor is configured to detect an alignment quality between the first and second communications circuits, and wherein the alignment sensor is configured to produce a feedback signal indicative of the detected alignment quality.

18. The satellite terminal defined in claim 17, wherein the feedback signal comprises a feedback signal selected from the group consisting of: an audible feedback signal, a visual feedback signal, and a haptic feedback signal.

19. The satellite terminal defined in claim 18, wherein the alignment sensor comprises a sensor selected from the group consisting of: a magnetic sensor and an optical sensor.

20. The satellite terminal defined in claim 18, wherein the alignment sensor is at least partially located in the second housing.

* * * * *